(12) United States Patent  
Powell

(10) Patent No.: US 6,220,282 B1  
(45) Date of Patent: Apr. 24, 2001

(54) BACKFLOW PREVENTION APPARATUS

(75) Inventor: Douglas H. Powell, Sacramento, CA (US)

(73) Assignee: Hunter Innovations, Inc., Sacramento, CA (US)

( * ) Notice: Subject to any disclaimer, the term of this patent is extended or adjusted under 35 U.S.C. 154(b) by 0 days.

(21) Appl. No.: 09/433,519

(22) Filed: Nov. 3, 1999

(51) Int. Cl.[7] ..................................................... F16K 15/00
(52) U.S. Cl. ................. 137/512; 137/527.8; 137/315.11; 137/454.2
(58) Field of Search .................................. 132/512, 613, 132/614, 614.2, 614.21, 614.01, 454.2, 454.6, 527, 527.6, 527.8; 251/298, 338; 137/315.11, 315.33

(56) References Cited

U.S. PATENT DOCUMENTS

| 2,630,294 | 3/1953 | Ericson et al. ........................ 251/93 |
| 2,842,150 | 7/1958 | Olson .................................... 137/87 |
| 2,845,085 | * 7/1958 | Robbins ............................... 137/512 |
| 3,294,115 | 12/1966 | Koenigsberg et al. .............. 137/527 |
| 3,422,841 | 1/1969 | Farrer .................................... 137/461 |
| 3,974,854 | 8/1976 | Kurpanek ............................ 137/512 |
| 4,232,704 | * 11/1980 | Becker et al. ....................... 137/512 |
| 4,259,983 | * 4/1981 | Kessel .................................. 137/512 |
| 4,270,559 | 6/1981 | Wallberg ................................ 137/15 |
| 4,313,462 | 2/1982 | Adamson .......................... 137/512.1 |
| 4,332,271 | 6/1982 | Rohr .................................... 137/315 |
| 4,566,489 | * 1/1986 | Knapp et al. ........................ 137/614 |
| 4,576,234 | * 3/1986 | Upchurch ........................ 137/614.21 |
| 4,874,012 | 10/1989 | Velie .................................... 137/557 |
| 4,893,654 | 1/1990 | Feuz ................................. 137/614.2 |
| 5,046,525 | * 9/1991 | Powell ................................. 137/527 |
| 5,148,828 | * 9/1992 | Farnham ............................. 137/512 |
| 5,203,365 | 4/1993 | Velie ................................. 137/454.2 |
| 5,207,242 | * 5/1993 | Daghe et al. ........................ 137/512 |
| 5,236,009 | 8/1993 | Ackroyd .............................. 137/527 |
| 5,524,663 | 6/1996 | Walsh et al. ........................... 137/15 |
| 5,584,315 | 12/1996 | Powell ................................. 137/315 |
| 5,785,077 | 7/1998 | Rice .................................... 137/315 |
| 5,947,152 | * 9/1999 | Martin et al. ........................ 137/527 |
| 6,050,293 | * 4/2000 | Lin et al. ............................. 137/512 |

FOREIGN PATENT DOCUMENTS

| 1194358 | 6/1970 | (GB) ............................. F16K/31/06 |
| 63-30667 | 7/1986 | (JP) ................................. F16K/1/22 |
| 64-21287 | 7/1987 | (JP) ............................... F16K/37/00 |

* cited by examiner

*Primary Examiner*—John Rivell  
(74) *Attorney, Agent, or Firm*—Sierra Patent Group, Ltd.

(57) ABSTRACT

A double check valve backflow prevention apparatus of lightweight modular construction. The apparatus comprises a primary housing component having a flangeless lateral opening, a first check valve module which fits within the lateral opening a second check valve module which also fits within the lateral opening a central housing component, with the central housing fitting within the lateral opening between the first check valve module and second check valve module. A first fluid tight seal is positioned between the first check valve module and central housing component, and a second fluid tight seal is positioned between the second check valve module and central housing component. A third fluid tight seal is positioned between the first check valve module and the primary housing component, and a fourth fluid tight seal is positioned between the second check valve module and the primary housing component. The primary housing component, first and second check valve modules and central housing component define a complete, fluid-tight valve body or assembly.

20 Claims, 6 Drawing Sheets

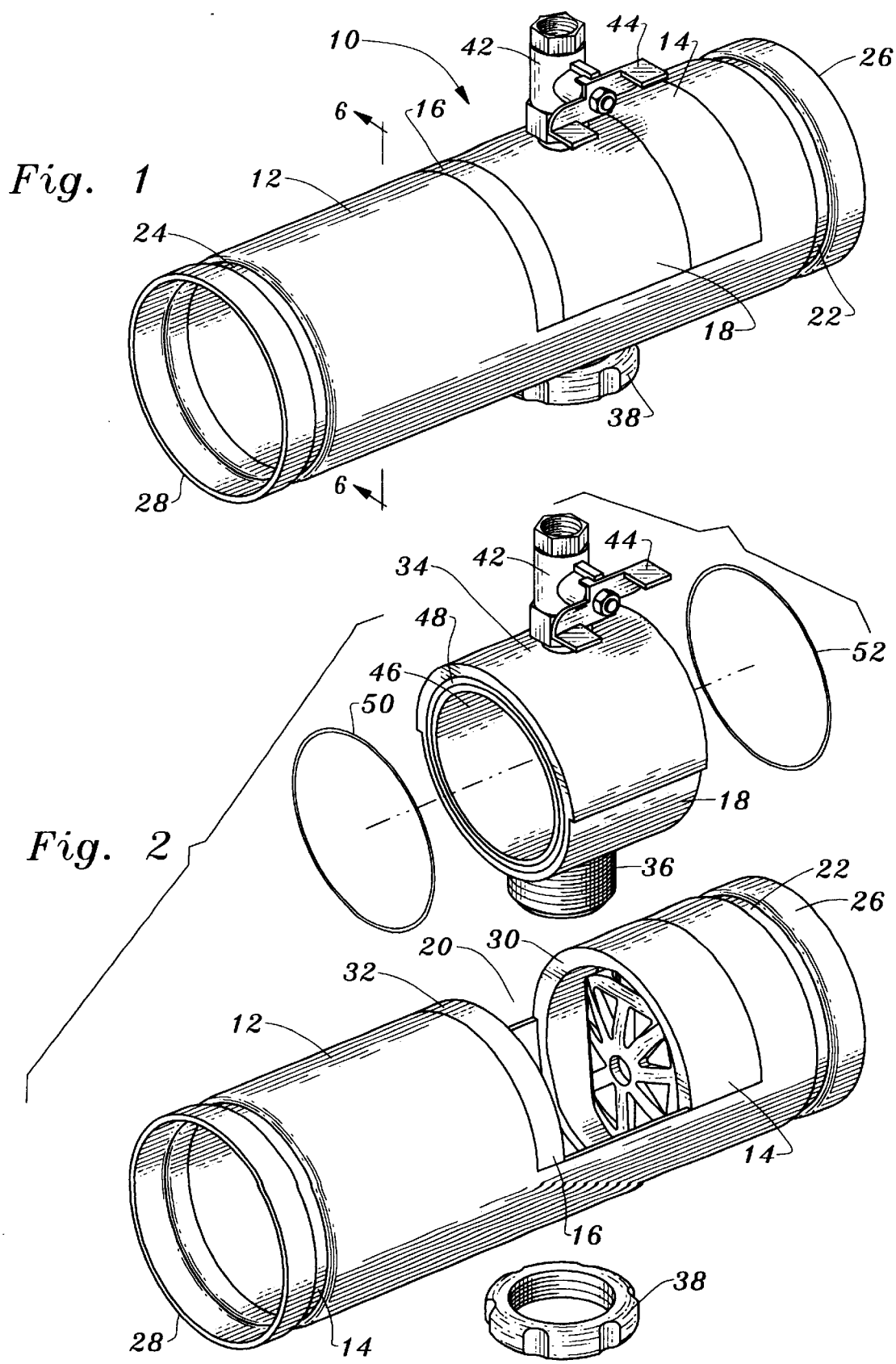

BACKFLOW PREVENTION APPARATUS

BACKGROUND OF THE INVENTION

1. Field of the Invention

The present invention pertains generally to devices, assemblies and systems for backflow prevention. More particularly, the present invention pertains to a compact, light weight, low maintenance double check valve backflow prevention apparatus of modular construction which is easily assembled and disassembled, which does not require a side port extension or flange, and which does not require a separate cover or lid for a side port.

2. Description of the Background Art

Backflow prevention devices are widely used to prevent undesirable flow reversal under low flow, static or backpressure situations wherein clean upstream fluid sources can be contaminated by downstream fluid. Backflow prevention devices typically comprise one or two check valves, housed within a valve body, which undergo closure under backflow, backpressure or back siphonage conditions. The use of backflow prevention devices is generally required by law for cross-connected water supplies where potable water could undergo contamination due to flow reversal or back pressure conditions.

Currently used double check valve backflow preventers have proved deficient in various respects. Particularly, such back flow preventers are prone to relatively high flow losses due to the valve configurations and closure mechanisms employed, especially under low flow conditions. Further, back flow preventer assemblies typically require a bulky, heavy cast housing with a side port tube or extension and a separately cast port cover. This type of housing is expensive to manufacture and requires a substantial amount of space to accommodate the side port tube and cover. The check valves are typically bolted to seats within the housing, and can only be reached through the side port tube, which hinders access to the check valves. Maintenance and replacement of the check valves requires a person to reach through the side port tube and loosen bolts, compression rods or other internal hardware in order to remove the check valves, and thus tends to be a difficult and expensive operation.

Accordingly, there is a need for a backflow prevention apparatus which is compact and light weight, which is easy and inexpensive to manufacture, which does not have a side port tube, and which provides easy access to internal check valves. The present invention satisfies these needs, as well as others, and generally overcomes the deficiencies found in the background art.

SUMMARY OF THE INVENTION

The invention is a double check valve backflow prevention apparatus of lightweight, compact, modular construction which eliminates the bulky side port and cover of conventional check valve assemblies. In general terms, the invention comprises a primary housing component having a lateral opening, a first check valve module which fits within the lateral opening a second check valve module which also fits within the lateral opening a central housing component, said central housing fitting within the lateral opening between the first check valve module and second check valve module, a first seal means for maintaining a fluid tight seal positioned between the first check valve module and central housing component, and a second seal means for maintaining a watertight seal positioned between the second check valve module and central housing component, with the primary housing component, first and second check valve modules and central housing component defining a complete, fluid-tight valve body or assembly.

By way of example, and not of limitation, the first and second check valve modules each preferably include an outer housing section, portion or wall, with the housing sections being generally structured and configured to fit adjacent the edges of the lateral opening in the primary housing component. The outer housing sections may be detachable from the check valve assemblies. The central housing component also includes an outer housing section, and is structured and configured to fit between the housing sections on the first and second check valve modules. A conventional check valve assembly is also associated with each of the check valve modules. The assembled primary housing component, check valve modules and central housing component define a complete, fluid-tight valve body which can be incorporated directly into a fluid flow system. Preferably, the lateral opening in the primary housing component is flangeless, so that the assembled primary housing component, check valve modules and central housing component provide a smooth, compact, cylindrical valve body with no lateral extensions or protrusions.

Preferably, a third seal means for maintaining a fluid tight seal is positioned between the first check valve module and the primary housing component, and a fourth seal means for maintaining a fluid tight seal is positioned between the second check valve module and the primary housing component.

The apparatus of the invention is assembled by placing the upstream and downstream check valve modules into the lateral opening of the main housing component, and respectively positioning the upstream and downstream check valve modules so that the housing sections on the modules are respectively adjacent the upstream and downstream edges of the lateral opening. The check valve modules are structured and configured such that, once positioned adjacent the upstream and downstream edges of the lateral opening, the check valves are properly located within the main housing component in generally the center of the flow stream. The central housing component or module is then placed within the lateral opening between the upstream and downstream check valve modules. The central housing module is held in place by a single bolt which extends laterally through the main housing component and into the central housing module.

The central housing module, check valve modules and main housing component are structured and configured such that, when assembled, each component or module is held securely in place by the adjacent component or module. The central module and check valve modules may additionally be secured together by a bolt. The central housing component and the housing sections on the upstream and downstream check valve modules effectively cover or fill the lateral opening and define a part of the overall housing or body of the apparatus. The seal means are preferably provided by o-rings or other elastomeric seals positioned between the central housing component the check valve modules, and between the check valve modules and the primary housing component or body so that the assembled structure is fluid-tight. The modular nature of the apparatus of the invention allows for small, light weight construction and easy manufacture and assembly, and provides a compact, portless valve body when fully assembled.

The check valve modules are held in position with respect to the main housing component by the interposed central housing component, and additional hardware is not needed to hold the check valves in place in the main housing body. In order to repair or replace the check valves, one need only unfasten and remove the central housing component from the main housing component in order to remove or access the check valve modules. Since the lateral opening does not have a side extension or flange, the check valves are easier to reach than in conventional double check valve backflow prevention devices. Also, since the check valve modules are held in place by the central housing component itself, no further disassembly is need to detach and remove the check valves. The present invention thus eliminates the difficulty of accessing check valves through a side port extension which occurs in conventional, previously available backflow prevention devices.

An object of the invention is to provide a backflow prevention apparatus which is compact and light weight.

Another object of the invention is to provide a backflow prevention apparatus which is easy and inexpensive to manufacture.

Another object of the invention is to provide a backflow prevention apparatus of modular construction.

Another object of the invention is to provide a backflow prevention apparatus which does not have a side port tube.

Another object of the invention is to provide a backflow prevention apparatus which does not require a formed port cover.

Another object of the invention is to provide a backflow prevention apparatus which allows quick and easy access to check valves for service, repair and replacement.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

FIG. 1 is a perspective view of a backflow prevention apparatus in accordance with the present invention.

FIG. 2 is a partially exploded view of the backflow prevention apparatus of FIG. 1.

DETAILED DESCRIPTION OF THE PREFERRED EMBODIMENTS

Figure 3:
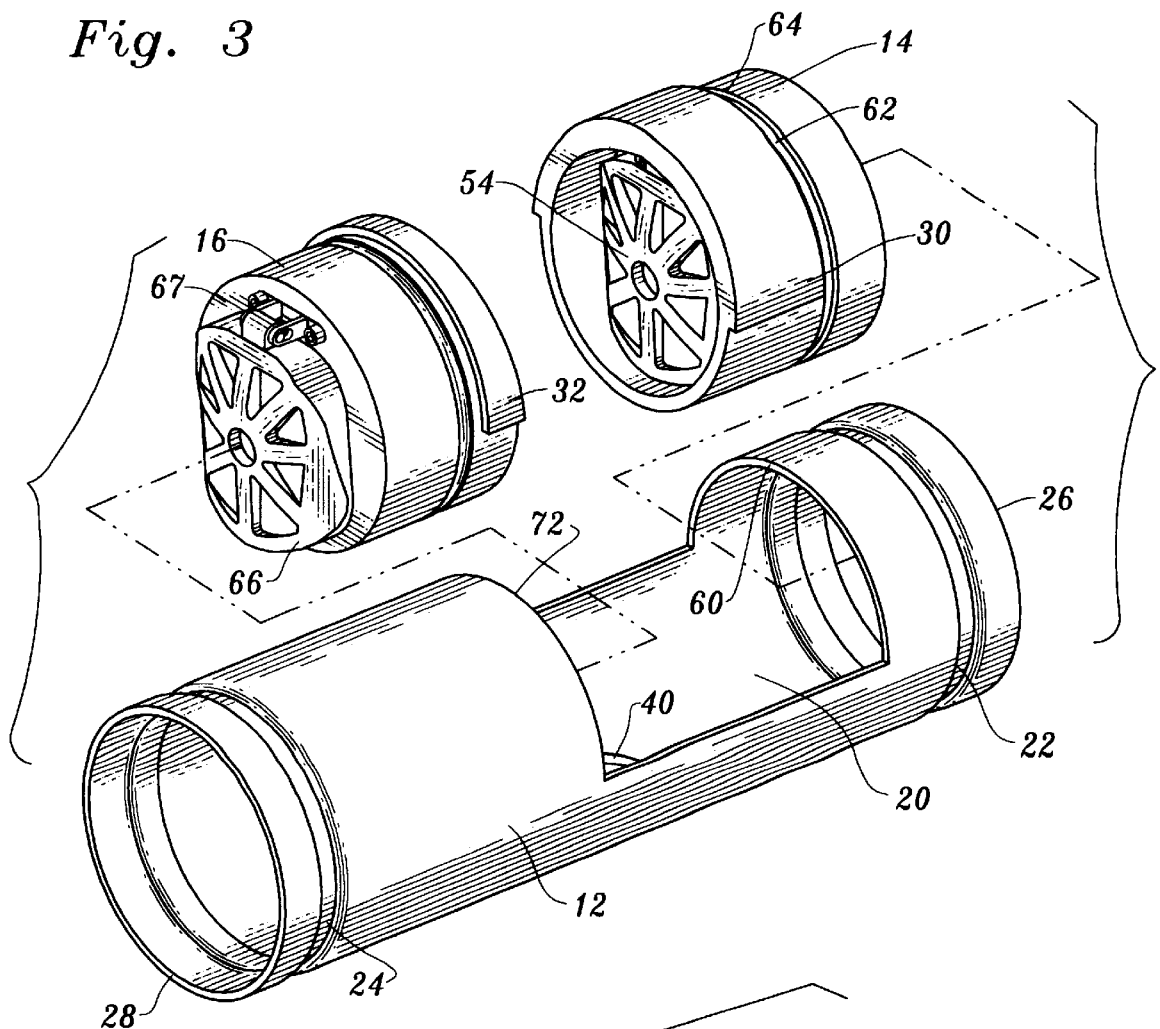
FIG. 3 is a partially exploded view of the backflow prevention apparatus of FIG. 1 shown without the central housing module.

Referring more specifically to the drawings, for illustrative purposes the present invention is embodied in the apparatus shown generally in FIG. 1 through FIG. 8. It will be appreciated that the apparatus may vary as to configuration and as to details of the parts without departing from the basic concepts as disclosed herein. The invention is disclosed generally in terms of backflow prevention. However, it will be readily apparent to those skilled in the art that the invention may be applied in various situations wherein check valves are used to interrupt fluid flow under selected conditions.

Referring now to FIG. 1 through FIG. 8, a backflow prevention apparatus 10 in accordance with the invention is generally shown. Backflow prevention apparatus 10 comprises a main or primary housing body or component 12, a first, upstream check valve assembly, module or component 14, a second, downstream check valve assembly, module or component 16, and a central housing component or module 18. Primary housing component 12 is of generally tubular structure and configuration and defines a generally tubular valve body for the apparatus 10. Primary housing component includes a laterally facing opening 20, and includes coupling grooves 22, 24 at its upstream end 26 and downstream end 28 respectively. Fluid flow through backflow prevention apparatus 10 moves from upstream to downstream as indicated by flow arrow F. Opening 20 is preferably flangeless as shown.

First check valve module 14 includes an outer housing or wall section 30, while second check valve module 16 includes an outer housing or wall section 32, and central housing module 18 also includes an outer housing or wall section 34. The housing sections 30, 32, 34 of modules 14, 16, 18, together with primary housing component 12, define a generally complete valve body for the backflow prevention apparatus 10 when assembled, as described further below. Central housing module 18 is coupled to primary housing component 12 via bolt 36 and nut 38. Bolt 36 extends through an opening 40 in primary housing component 12. Central housing module 18 preferably includes a vent 42 and hand actuated vent valve assembly 44.

Central housing module is of generally cylindrical shape and is structured and configured to conform to the internal bore of primary housing component 12. Central housing component 18 has a truncated tubular shape and defines a generally tubular flow path 46 extending therethrough. An annular groove 48 in central housing module 18 accommodate a resilient o-ring 50 which provides fluid tight sealing means between central housing module 18 and second check valve module 16. A resilient o-ring 52 is accommodated in a like annular groove (not shown) to provide fluid tight sealing means between central housing module 18 and first check valve module 14. Various other sealing means may alternatively be used in place of o-rings 50, 52, including, for example, a silicone grease or dispensed silicone sealant, an elastomeric strip, or other conventional sealing means suitably positioned between check valve module 14, 16 and central housing module.

Figure 4:
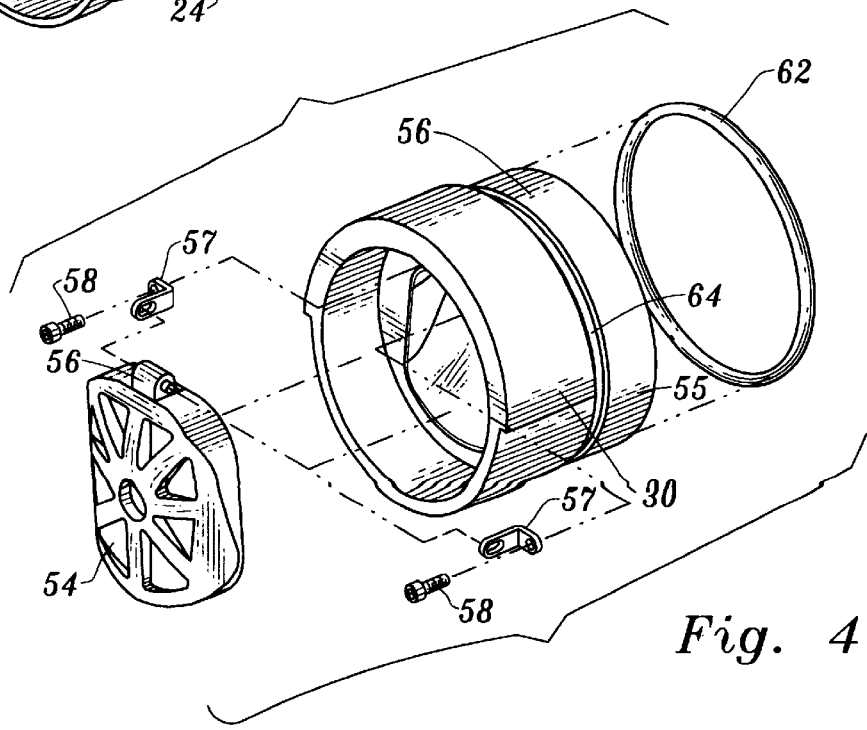
FIG. 4 is an exploded view of the upstream check valve module of FIG. 3.

Referring more particularly to FIG. 3 and FIG. 4, upstream check valve module 14 includes a clapper 54 and a seat 55, with clapper 54 pivotally coupled to the top edge of seat 55 by a hinge member 56 and gudgeons 57. Screws 58 couple gudgeons 57 to seat 55. Seat 55 is generally structured and configured to sealingly engage clapper 54, and to fit within and conform to the interior of primary housing component 12. When the backflow prevention apparatus 10 is fully assembled as described further below, the seat portion 55 of upstream check valve module 14 is positioned within primary housing component 12 upstream from lateral opening 20, while housing or wall section 30 of upstream check valve module 14 is positioned within lateral opening 20 adjacent upstream edge 60. A resilient o-ring 62 fits within groove 64 (FIG. 4) on seat 55 to provide fluid tight sealing means between upstream check valve module 14 and primary housing component 12. Various other sealing means may be used as alternatives to o-ring 62, with the sealing means suitably positioned between check valve module 14 and housing component 12 such that a fluid tight seal is maintained when check valve module is assembled with housing component 12.

Figure 5:
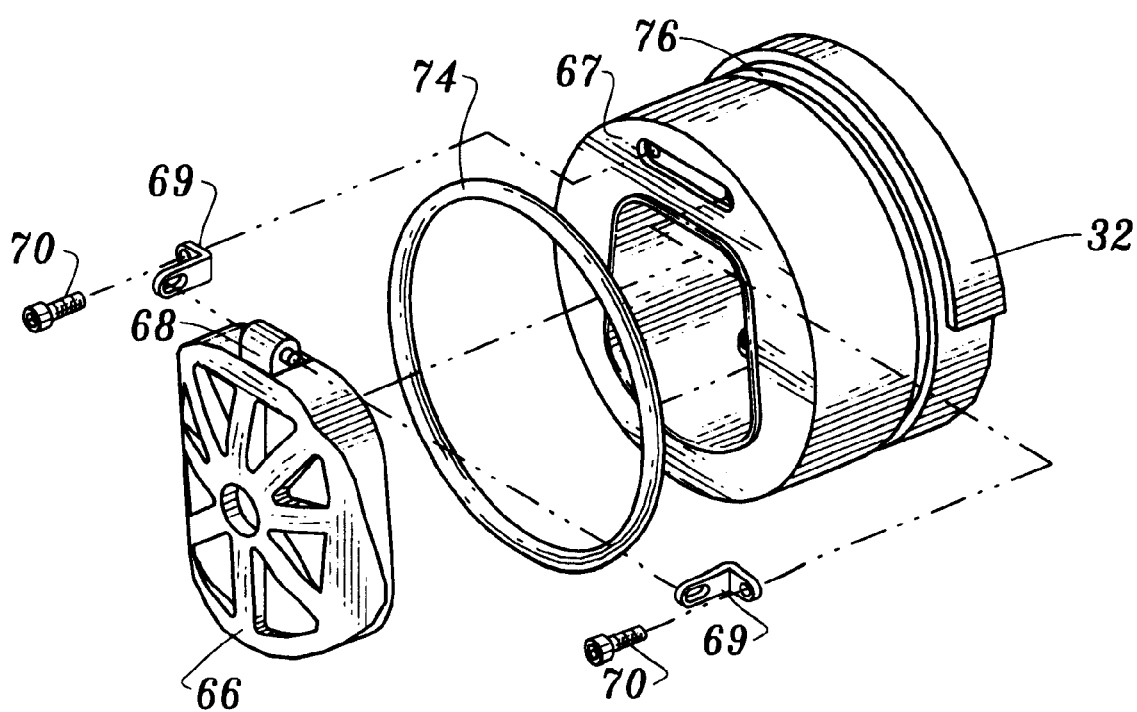
FIG. 5 is an exploded view of the downstream check valve module of FIG. 3.

Referring also to FIG. 5, downstream check valve module 16 likewise includes a clapper 66 and seat 67, with clapper 66 pivotally coupled to seat 67 by hinge 68 and gudgeons 69. Screws 70 couple gudgeons 69 to seat 67. The external shape of seat 68 is structured and configured to conform generally to the internal bore of primary housing component 12, and when the apparatus 10 is assembled, seat 68 of downstream check valve module 16 is positioned in primary housing component 12 downstream from lateral opening 20, with housing or wall section 32 positioned adjacent the downstream edge 72 of lateral opening 20. A resilient o-ring 74 within groove 76 provides fluid tight sealing means between downstream check valve module 16 and primary housing component 12.

Figure 6:
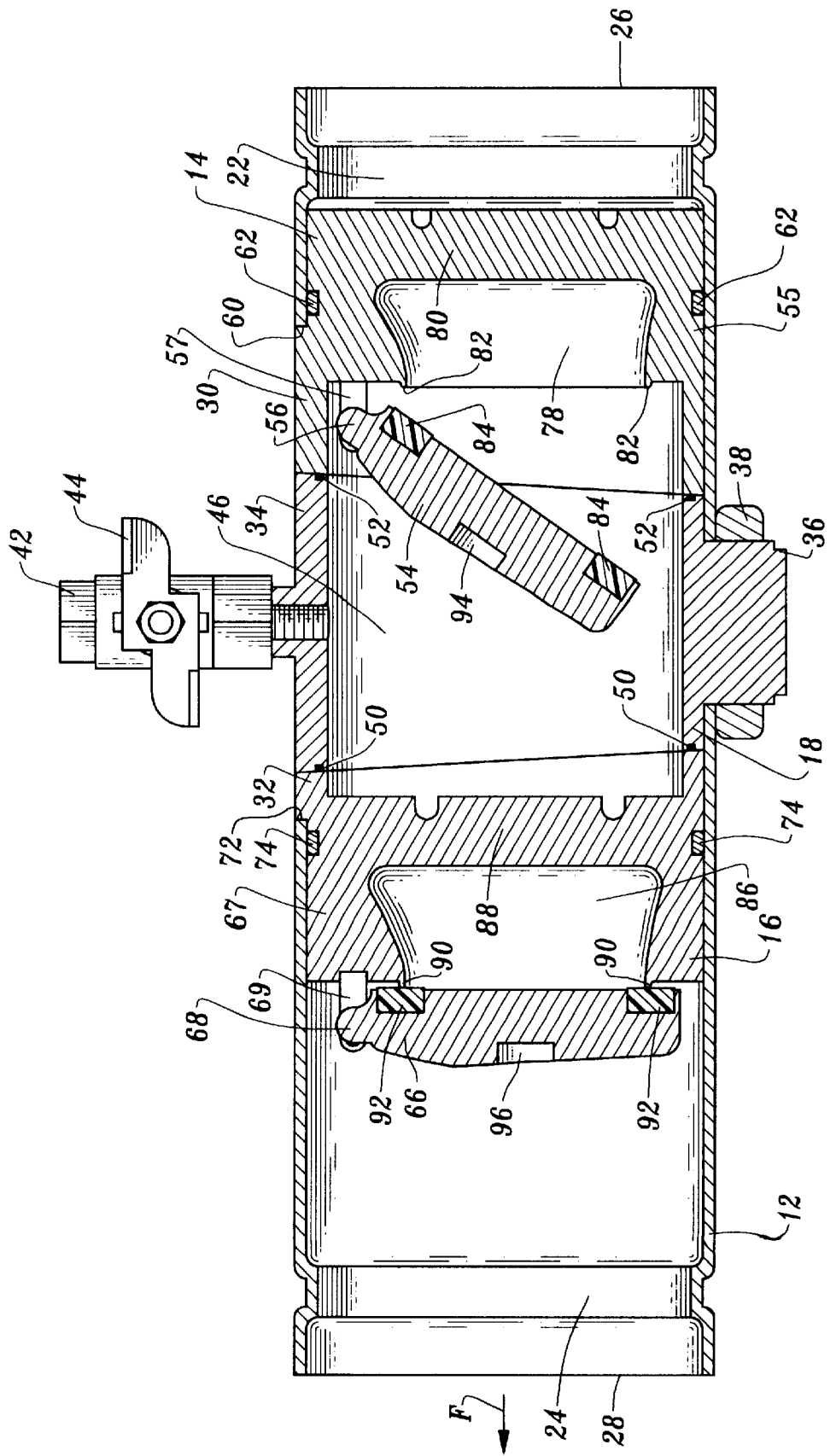
FIG. 6 is a side elevation view, in cross-section, of the backflow prevention apparatus of FIG. 1 shown through line 6—6.

Referring now to FIG. 6 as well, seat 55 of upstream check valve 14 is structured and configured to define a venturi-shaped flow path 78, with the inner surface of seat 55 being generally tapered from upstream to downstream to provide the venturi shape to flow path 78. Seat 55 preferably includes a vertically oriented member 80 positioned generally in the center of flow path 78. A conventional closure mechanism (not shown) is mounted on member 80 or is otherwise associated with seat 55, with the closure mechanism being structured and configured to exert a closure force on clapper 54 in the upstream direction such that clapper 54 is drawn towards seat 55 in a standard fashion. The closure mechanism may comprise, for example, a spring biased assembly, a magnetic biased assembly, an elastomer-biased assembly, or other type of closure mechanism wherein a closure force is exerted on clapper 54 to draw clapper 54 towards seat 55. An annular lip 82 on seat 55 and corresponding annular seal 84 on clapper 54 provide a fluid tight seal when clapper 54 is closed against seat 55.

Seat 67 of downstream check valve 16 is likewise structured and configured to define a venturi-shaped flow path 86, with the inner surface of seat 67 being generally tapered from upstream to downstream to provide the venturi shape to flow path 86. Seat 67 preferably includes a vertically oriented member 88 positioned generally in the center of flow path 86. A conventional Closure mechanism (not shown) is mounted on member 88 or is otherwise associated with seat 67, with the closure mechanism being structured and configured to exert a closure force on clapper 66 in the upstream direction such that clapper 66 is drawn towards seat 67. As noted above, the closure mechanism may comprise a spring biased assembly, a magnetic biased assembly, an elastomer-biased assembly, or other type of closure mechanism wherein a closure force is exerted on clapper 66 to draw clapper 66 towards seat 67. An annular lip 90 on seat 67 and corresponding annular seal 92 on clapper 66 provide a fluid tight seat when clapper 66 is closed against seat 67.

The backflow prevention apparatus 10 is assembled by positioning upstream check valve module 14 in lateral opening 20 of primary housing component, and fitting the seat portion 55 of check valve module 14 into the tubular interior of primary housing component 12 and pushing seat portion 55 towards the upstream end 26 of primary housing component 12 until outer wall section 30 is adjacent or abuts upstream edge 60 of lateral opening 20. When thus assembled, seal 62 is positioned between check valve module 14 and housing component 12 to provide a fluid tight seal. Downstream check valve module 16 is then positioned within lateral opening 20, and the seat portion 67 thereof is fitted into the tubular interior of primary housing component 12 until outer wall section 32 abuts downstream edge 72 of lateral opening 20. As thusly assembled, seal 76 is positioned between check valve module 16 and housing component 12 to provide a fluid tight seal.

Central housing component 18 is then placed in lateral opening 20 between upstream and downstream check valve modules 14, 16 and is positioned so that flow paths 86, 46 and 78 of downstream check valve module 16, central housing module 18 and upstream check valve module respectively are generally contiguous and so that bolt 36 on central housing module extends through bore 40 in primary housing component 12. Central housing module 18, and upstream and downstream check valve modules 14, 16, preferably are slightly tapered in shape, as can be seen most clearly in FIG. 6, to facilitate the insertion and positioning of central housing module 18 between upstream and downstream check valve modules 14, 16. When assembled thus, seals 50, 52 are positioned between central housing module 18 and check valve modules 14, 16 respectively.

Once thus assembled, central housing module 18 is secured in position by tightening nut 38 onto bolt 36. When thus assembled, fluid-tight seal 62 is positioned between primary housing component 12 and upstream check valve module 14, and fluid-tight seal 74 is positioned between primary housing component 12 and downstream check valve module 16. Fluid-tight seals 50, 52 are positioned between central housing component 12 and upstream and downstream check valves 14, 16 respectively. Primary housing component 12, together housing or wall sections 30, 32, 34 on modules 14, 16, 18 respectively, define generally a complete valve body for the apparatus 10, and housing or wall sections 30, 32, 34 define a cover for lateral opening 20.

The backflow prevention apparatus 10, when assembled as described above, is then ready for coupling into a fluid line or pipe (not shown) via coupling grooves 22, 24 in a conventional manner. Backflow prevention apparatus 10 will typically be positioned between upstream and downstream shutoff valves in the fluid line to allow fluid shutoff during inspection or maintenance of the apparatus 10.

In operation, clappers 54, 66 will generally remain closed under static, nonflow conditions, with the closure mechanisms (not shown) holding clappers 54, 66 against their corresponding seats 55, 67. FIG. 6 shows clapper 54 in a partially open position, and shows clapper 66 in a closed position, for illustrative purposes. Under flow conditions, fluid moving in flow direction F exerts a force against clappers 54, 66. When the force exerted by the fluid exceeds the closure force exerted on the clappers 54, 66 by their respective closure mechanisms, clappers 54, 66 will open and allow fluid flow in direction F. When static conditions return or when a backflow condition arises, clappers 54, 66 will again be drawn closed against seats 55, 67 by their respective closure mechanisms to prevent potentially contaminated downstream fluid from returning upstream.

The backflow prevention apparatus 10 is particularly advantageous when a user wishes to inspect or repair check valve modules 14, 16. In order to effect a repair in a conventional backflow preventer, it is generally necessary for a user to disconnect and remove a side port lid and then reach through a side port extension to reach the internal check valve assemblies. This operation has traditionally tended to be to be difficult and time intensive. The modular nature of the present invention, however, eliminates the need for a side port extension and lid, and greatly facilitates the inspection and repair of check valves. In order to access the check valves associated with check valve modules 14, 16, a user need only remove nut 38 from bolt 34 on central housing module 18, and remove nuts and bolts 40, 42 from central housing module and check valve modules 14, 16, 18. Since nuts 38, 42 and bolts 40 are externally located, this is easily carried out. Then, instead of having to reach into primary housing component 12 to investigate check valves, the user can disengage and remove central housing module 18 from between check valve modules 14, 16, and then disengage and remove check valve modules 14, 16 and inspect or make repairs thereto outside of main housing component 12. When inspection or repair is complete, the apparatus is re-assembled as described above.

Clappers 54, 66 each include an indent 94, 96 respectively which can be modified to accommodate a poppet valve (not shown). Poppet valves may thus be installed in clappers 54, 66 to provide an additional path for fluid flow under particular conditions. The poppet valves are biased separately from clappers 56, 66, and generally open under lower upstream flow pressure. Primary housing component 12 is preferably made of steel or aluminum. Check valve modules 14, 16 and central housing module 18 are preferably made from neat or reinforced engineering resin or plastic.

Figure 7:
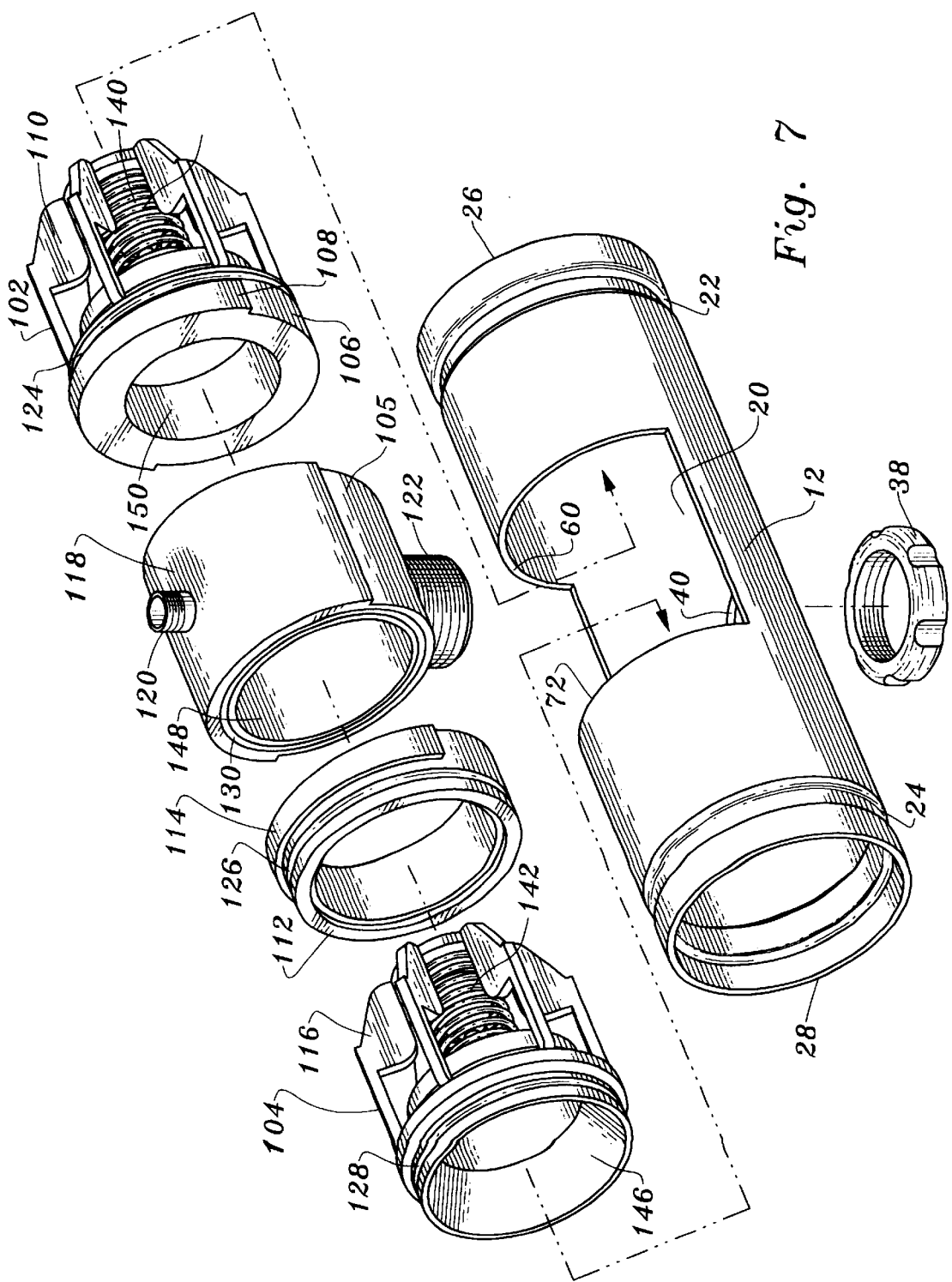
FIG. 7 is a partially exploded view of an alternative embodiment backflow prevention apparatus in accordance with the present invention.
Figure 8:
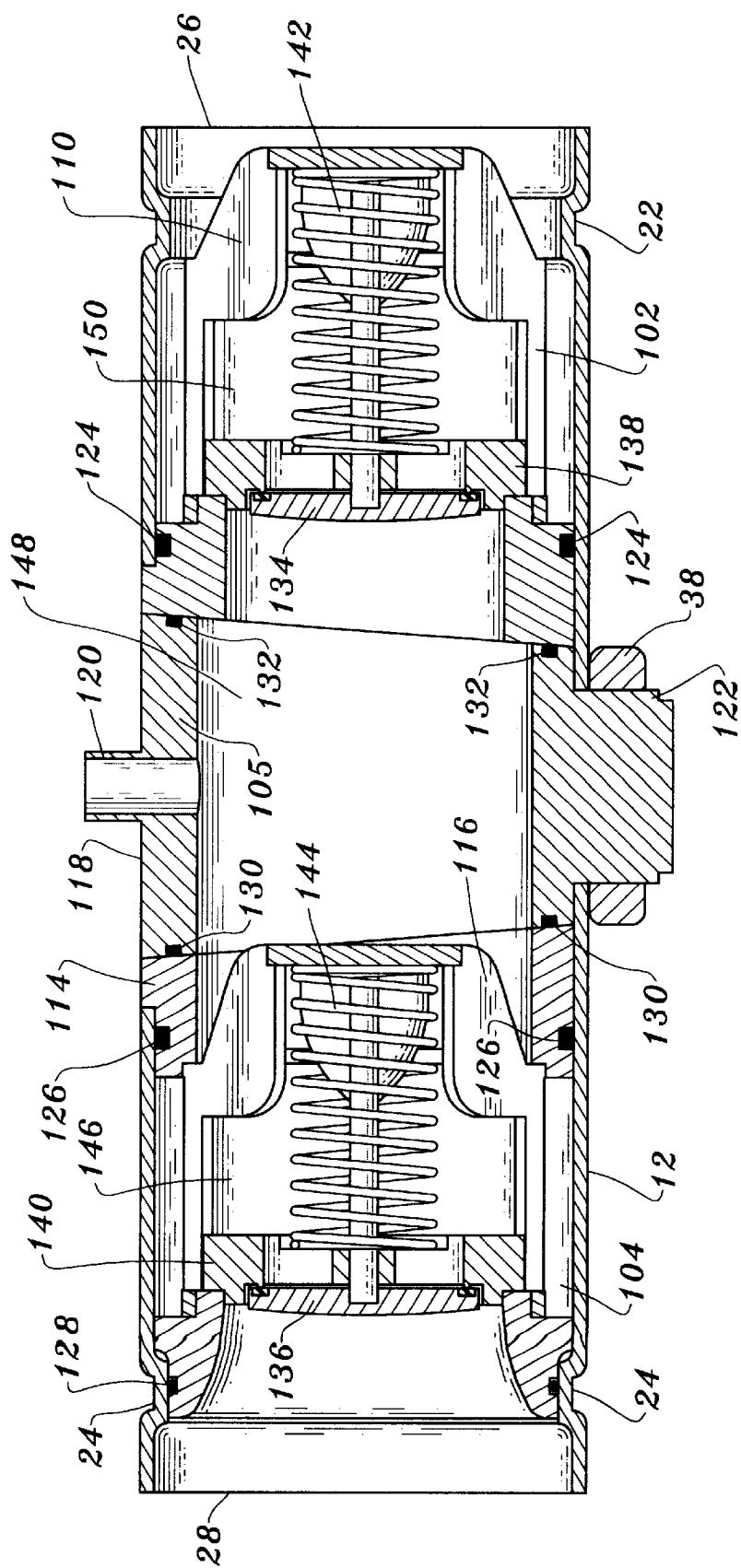
FIG. 8 is a side elevation view, in cross-section, of the backflow prevention apparatus of FIG. 7.

Referring now to FIG. 7 and FIG. 8, an alternative embodiment backflow prevention apparatus 100 is shown, wherein like reference numbers are used to denote like parts. The apparatus 10 includes a generally tubular main housing component 12, with check valve modules 102, 104, and a central housing module 105. Main housing component includes a lateral opening 20, coupling grooves 24, 26, and opening 40, as described above.

Upstream check valve module 102 includes a detachable ring section 106 with an outer housing or wall section 108 thereon, and a poppet-type check valve assembly 110. Downstream check valve module 104 includes a detachable ring section 112 with an outer housing or wall section 114 thereon, and a poppet-type check valve assembly 116. Ring element or section 112 is shown detached from downstream check valve module 104, while ring element or section 106 is shown coupled to upstream check valve module 102. Ring elements 106, 112 releasibly couple to modules 102, 104 by snap fitting or other conventional coupling means. Ring elements 106, 112 may alternatively be integral to check valve modules 102, 104 and non-detachable.

Central module 105 includes an outer wall or housing portion 118. Central module 105 also includes a vent 120 and a threaded bolt 122. Vent 120 is externally threaded to allow attachment of a vent valve assembly (not shown). Bolt 122 is structured and configured to extend through hole 40 in main housing component 12 and to engage nut 38.

A resilient o-ring seal 124 is included on upstream check valve module 102, and is preferably located on ring element 106. When the apparatus 100 is assembled, seal 120 is positioned to provide a fluid-tight seal between check valve module 102 and main housing component 112. Downstream check valve module 104 likewise includes a resilient o-ring seal 126 located on ring element 112, such that seal 126 is positioned between check valve module 104 and main housing component 12 when the apparatus 100 is assembled. Downstream check valve module 104 may include an additional o-ring seal 128. An o-ring seal 130 is included with central housing module and is positioned to provide a fluid tight seal between central module 105 and downstream check valve module 104 when the apparatus is assembled. An o-ring seal 132 (FIG. 8) is similarly positioned between central module 105 and upstream check valve assembly 102 to impart a fluid tight seal. Additional seals or sealants may be utilized as required to provide a fluid tight seal between the adjacent modular components of the apparatus 100.

Poppet valve assemblies 110, 116 are of conventional design, and respectively include poppet valves 134, 136 (FIG. 7) which are biased against valve seats 138, 140 by respective spring bias assemblies 142, 144. As noted above, various types of check valves and valve closure mechanisms may be used with the invention, and poppet valve assemblies 110, 116 are thus merely exemplary.

The backflow prevention apparatus 100 is assembled by positioning upstream check valve module 102 in lateral opening 20 of main housing component 12 such that valve assembly 110 fits into the tubular interior of main housing component 12, with outer wall section 108 positioned adjacent to or abutting upstream edge 60 of lateral opening 20. When thus assembled, seal 124 is positioned between check valve module 102 and housing component 12 to provide a fluid tight seal. Downstream check valve module 104 is positioned within lateral opening 20 such that the valve assembly 116 thereof is fitted into the tubular interior of main housing component 12, with outer wall section 32 abutting or adjacent to downstream edge 72 of lateral opening 20. As thusly assembled, seals 126 and 128 are positioned between check valve module 104 and housing component 12 to provide a fluid tight seal.

The central housing component 105 is then placed in lateral opening 20 between upstream and downstream check valve modules 102, 104 and positioned so that flow paths 146, 148, 150 of downstream check valve module 104, central housing module 105 and upstream check valve module 102 respectively are generally contiguous, and so that bolt 122 on central housing module 105 extends through bore 40 in main housing component 12. Central housing module 105, and upstream and downstream check valve modules 102, 104, preferably are slightly tapered in shape, as can be seen most clearly in FIG. 7, to facilitate the insertion and positioning of central housing module 105 between upstream and downstream check valve modules 102, 104. When assembled thus, seals 130, 132 are positioned between central housing module 105 and check valve modules 102, 104 respectively.

When assembled in the manner described above, central housing module 105 is secured in position by tightening nut 38 onto bolt 122. When thus assembled, fluid-tight seal 124 is positioned between primary housing component 12 and upstream check valve module 102, and fluid-tight seals 126, 128 are positioned between primary housing component 12 and downstream check valve module 104. Fluid-tight seals 130, 132 are positioned between central housing component 12 and upstream and downstream check valves 102, 104 respectively. Primary housing component 12, together housing or wall sections 108, 114, 118 on modules 102, 104, 105 respectively, define generally a complete valve body for the apparatus 100, with housing or wall sections 108, 114, 118 defining a cover for lateral opening 20.

The backflow prevention apparatus 100, when assembled in the above manner, is ready for coupling into a fluid line or pipe (not shown) via coupling grooves 22, 24 in a standard fashion. The backflow prevention apparatus 100 operates in generally the same manner as described above for the apparatus 10, with the primary exception being that poppet-type check valves are used instead of clapper-type check valves.

Accordingly, it will be seen that this invention provides a double check valve backflow prevention apparatus of lightweight, compact, modular construction, which eliminates the bulky and inconvenient side port extension present in conventional valve housings, and which does not require a separate cover or lid for a side port. Although the description above contains many specificitics, these should not be construed as limiting the scope of the invention but as merely providing an illustration of the presently preferred embodiment of the invention.

Thus the scope of this invention should be determined by the appended claims and their legal equivalents.

What is claimed is:

1. A backflow prevention apparatus, comprising:
   (a) a primary housing component, said primary housing component having a lateral opening;
   (b) a first check valve module, said first check valve module fitting within said lateral opening;
   (c) a second check valve module, said second check valve module fitting within said lateral opening;
   (d) a central housing component fitting within said lateral opening said central housing component inserted between and abutting said first check valve module and said second check valve module;
   (e) a first seal positioned between and abutting said first check valve module and said central housing component;
   (f) a second seal positioned between and abutting said second check valve module and said central housing component;
   (g) said first check valve module, said second check valve module, and said central housing component defining a fluid-tight cover for said lateral opening.

2. A backflow prevention apparatus as recited in claim 1, wherein:
   (a) said first check valve module includes a first housing section, said first housing section structured and configured to fit adjacent a first edge of said lateral opening;
   (b) said second check valve module includes a second housing section, said second housing section structured and configured to fit adjacent a second edge of said lateral opening; and
   (c) said central housing component structured and configured to fit between said first and second housing sections.

3. A backflow prevention apparatus as recited in claim 1, further comprising third seal means for maintaining a fluid tight seal, said third seal means positioned between said first check valve module and said primary housing component.

4. A backflow prevention apparatus as recited in claim 3, further comprising fourth seal means for maintaining a fluid tight seal, said fourth seal means positioned between said second check valve module and said primary housing component.

5. A backflow prevention apparatus as recited in claim 1, wherein said first check valve module and said second check valve module each comprise:
   (a) a clapper; and
   (b) a seat, said clapper pivotally coupled to said seat.

6. A backflow prevention apparatus as recited in claim 5, wherein each said seat defines a flow path having a venturi-shape.

7. A backflow prevention apparatus as recited in claim 1, wherein said lateral opening in said primary housing component is flangeless.

8. A backflow prevention apparatus as recited in claim 1, wherein each said check valve module further comprises a poppet valve assembly.

9. A backflow prevention apparatus, comprising:
   (a) a tubular valve body, said tubular valve body having a lateral opening;
   (b) a first check valve module, said first check valve module having a first outer wall section, said first check valve module fitting within said lateral opening;
   (c) a second check valve module, said second check valve module having a second outer wall section, said second check valve module fitting within said lateral opening;
   (d) a central module, said central module having a third outer wall section, said central module structured and configured to fit within said lateral opening and insert between said first check valve module and said second check valve module, said third outer wall section fitting between said first outer wall section and said second outer wall section;
   (e) first seal means for maintaining a fluid tight seal, said first seal means positioned between and abutting said first check valve module and said central module; and
   (f) second seal means for maintaining a fluid tight seal, said second seal means positioned between and abutting said second check valve module and said central module;
   (g) said first outer wall section, said second outer wall section and said third outer wall section defining a cover for said lateral opening.

10. A backflow prevention apparatus as recited in claim 9, further comprising third seal means for maintaining a fluid tight seal, said third seal means positioned between said first check valve module and said tubular valve body.

11. A backflow prevention apparatus as recited in claim 10, further comprising fourth seal means for maintaining a fluid tight seal, said fourth seal means positioned between said second check valve module and said tubular valve body.

12. A backflow prevention apparatus as recited in claim 9, wherein said first check valve module comprises:
   (a) a first clapper, said first clapper having a magnet centrally positioned on an inner surface of said first clapper; and
   (b) a first scat, said first clapper pivotally coupled to a top edge of said seat.

13. A backflow prevention apparatus as recited in claim 12, wherein said second check valve module comprises:
   (a) a second clapper, said second clapper having a magnet centrally positioned on an inner surface of said second clapper;
   (b) a second seat, said second clapper pivotally coupled to a top edge of said seat.

14. A backflow prevention apparatus as recited in claim 13, wherein said first seat defines a flow path having a venturi-shape, and wherein said second seat defines a flow path having an annular shape.

15. A backflow prevention apparatus as recited in claim 9, wherein said lateral opening in said tubular valve body is flangeless.

16. A backflow prevention apparatus as recited in claim 9, wherein said first check valve module further comprises a first poppet valve assembly, and wherein said second check valve module further comprises a second poppet valve assembly.

17. The backflow prevention apparatus as recited in claim 9, wherein said first outer wall section is detachable from said first check valve module.

18. A backflow prevention apparatus, comprising:

(a) a main housing component, said main housing component having a flangeless lateral opening;

(b) a first check valve module, said first check valve module having a first outer wall section, said first check valve module fitting within said lateral opening and positioned adjacent an upstream edge thereof;

(c) a second check valve module, said second check valve module having a second outer wall section, said second check valve module fitting within said lateral opening and positioned adjacent a downstream edge thereof;

(d) a central module, said central module having a third outer wall section, said central module structured and configured to fit within said lateral opening and insert between said first check valve module and said second check valve module, said third outer wall section fitting between said first outer wall section and said second outer wall section;

(e) first seal means for maintaining a fluid tight seal, said first seal means positioned between said first check valve module and said central module;

(f) second seal means for maintaining a fluid tight seal, said second seal means positioned between and abutting said second check valve module and said central module;

(g) third seal means for maintaining a fluid tight seal, said third seal means positioned between and abutting said first check valve module and said primary housing component; and (h) fourth seal means for maintaining a fluid tight seal, said fourth seal means positioned between said second check valve module and said primary housing component;

(i) said first outer wall section, said second outer wall section and said third outer wall section defining a cover for said lateral opening.

19. The backflow prevention apparatus as recited in claim 18, wherein said first outer wall section is detachable from said first check valve module.

20. The backflow prevention apparatus as recited in claim 19, wherein said second outer wall section is detachable from said second check valve module.

* * * * *